United States Patent
DiPiazza (10) Patent No.: US 8,078,161 B2
(45) Date of Patent: Dec. 13, 2011

(54) MILLIMETER WAVE COMMUNICATION SYSTEM

(75) Inventor: Gerald C. DiPiazza, Edenton, NC (US)

(73) Assignee: Pine Valley Investments, Inc., Las Vegas, NV (US)

(*) Notice: Subject to any disclaimer, the term of this patent is extended or adjusted under 35 U.S.C. 154(b) by 14 days.

(21) Appl. No.: 12/720,318

(22) Filed: Mar. 9, 2010

(65) Prior Publication Data

US 2010/0227547 A1    Sep. 9, 2010

Related U.S. Application Data (63) Continuation of application No. 10/849,579, filed on May 20, 2004, now Pat. No. 7,697,929.

(51) Int. Cl.
*H04W 4/00* (2009.01)
*H04M 11/04* (2006.01)

(52) U.S. Cl. .......... 455/426.1; 455/404.1; 455/426.2; 455/404.2; 455/7; 455/11.1; 455/13.1; 455/16; 455/456.1; 379/36; 379/338; 379/38; 379/43; 379/47; 379/48; 379/49; 379/50

(58) Field of Classification Search .......... 455/426.1, 455/404.1, 426.2, 7, 11.1, 13.1, 16, 404.2; 379/36–51, 338
See application file for complete search history.

(56) References Cited

U.S. PATENT DOCUMENTS

| | | | |
|---|---|---|---|
| 3,665,313 A | 5/1972 | Trent | 340/287 |
| 3,876,980 A | 4/1975 | Haemmig et al. | 714/822 |
| 5,118,134 A | 6/1992 | Mattes et al. | 280/735 |
| 5,774,789 A * | 6/1998 | van der Kaay et al. | 455/16 |
| 6,202,799 B1 | 3/2001 | Drop | 187/388 |
| 6,421,027 B1 | 7/2002 | Takatori et al. | 343/893 |
| 6,895,218 B2 | 5/2005 | Yarkosky | 455/20 |
| 7,020,890 B1 * | 3/2006 | Suematsu et al. | 725/78 |
| 2001/0031623 A1 | 10/2001 | Masoian | 455/11.1 |
| 2002/0177401 A1 | 11/2002 | Judd et al. | 455/11.1 |
| 2003/0146835 A1 | 8/2003 | Carter | 340/539.13 |
| 2003/0211827 A1 | 11/2003 | Yonezawa et al. | 455/7 |
| 2004/0137842 A1 | 7/2004 | Iwata et al. | 455/12.1 |
| 2004/0176027 A1 | 9/2004 | O'Neill | 455/7 |
| 2004/0198386 A1 | 10/2004 | Dupray | 455/451.1 |
| 2004/0203563 A1 | 10/2004 | Menard | 455/404.1 |
| 2004/0219924 A1 | 11/2004 | Flynn | 455/446 |
| 2005/0201397 A1 | 9/2005 | Petite | 370/401 |
| 2005/0213527 A1 | 9/2005 | Xie | 370/315 |
| 2006/0108181 A1 | 5/2006 | Bacellar et al. | 187/247 |

FOREIGN PATENT DOCUMENTS

JP    2004056457    2/2004

* cited by examiner

*Primary Examiner* — Charles Appiah
*Assistant Examiner* — Emem Stephen
(74) *Attorney, Agent, or Firm* — Allen, Dyer, Doppelt, Milbrath & Gilchrist, P.A.

(57) ABSTRACT

A communication system includes a first communication module, and a second communication module. The first communication module may receive a first type of communication signal (e.g. a mobile telephone signal) and convert it into a second-type of communication signal (e.g., a millimeter wave radio signal). The first type of communication signal may be a mobile telephone signal from a first fire fighter's mobile telephone who is located outside of the building. The first communication module may transmit the second-type of communication signal to the second communication module.

18 Claims, 6 Drawing Sheets

MILLIMETER WAVE COMMUNICATION SYSTEM

RELATED APPLICATION

This application is a continuation of Ser. No. 10/849,579 filed May 20, 2004, now U.S. Pat. No. 7,697,929, the entire disclosure of which is hereby incorporated herein by reference.

BACKGROUND

Telecommunication and data communications are an important part of everyday life. Examples of telecommunications systems are telephone systems, telegraph systems, radio broadcast systems, television systems, and mobile telephone systems.

Examples of telecommunication and date communication systems that are evolving, are wireless communications systems. An example of a wireless communication system is a mobile telephone system. In a mobile telephone system, users can communicate using a mobile telephone. A mobile telephone is a radio device that operates similar to a conventional wire-line telephone. A user can dial a telephone number in their mobile telephone and they will be connected with a telephone associated with the dialed number. Additionally, mobile (mobile) systems are adapted to transmit data as well.

Emergency rescue personnel (e.g. firemen, policemen, and paramedics) often use telecommunication systems in the process of saving lives. It is important for the different rescue personnel to communicate with each other. If a rescuer is unable to communicate with other rescuers during a rescue, human lives may be unnecessarily lost. For example, if a fire fighter is fighting a fire in a tall building and he is unable to communicate with his colleagues that he/she needs backup, that fire fighter's life may be in danger and he may be prevented from saving victims lives because he is unable to communicate his need for backup.

There are several reasons why a radio-based telecommunications system may fail. Of course, there is a desire to reduce the failure rate in communication systems so that rescuers can maintain communication with their colleagues. Further, there is an overall desire to improve telecommunication systems so that people with mobile telephones can communicate freely in a variety of locations.

SUMMARY

In accordance with an example embodiment, a communication system includes at least a first communication module adapted to: receive a first type of communication signal, convert the first type of communication signal to a second type of communication signal and transmit the second type of communication signal to a second communication module. Illustratively, the second communication module is disposed on a side of a building and adapted to receive the second type of communication signal from the first communication module, and transmit the second type of communication signal inside the building to a third communication module. The third communication module is located inside the building and adapted to receive the second type of communication signal, convert the second type of communication signal into the first type of communication signal, and transmit the first type of communication signal.

In accordance with an example embodiment, a communications method includes receiving a radio signal at a communication module where the communication module is mounted to a building and wherein the radio signal originated from an elevation different than the communication module. The method also includes transmitting the radio signal into the building.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

As will become clearer as the present description continues, illustrative embodiments relate to a communication system which uses millimeter wave radio signals. In an example embodiment, the communication system includes at least one first communication module, at least one second communication module, and at least one third communication module. The first communication module is adapted to receive a first type of communication signal (e.g. a mobile telephone signal) and convert it into a second type of communication signal. In an illustrative embodiment, the conversion (i.e. to a higher frequency).

Of course, this is not essential. To wit, the transmission from the first communication module to the second communication module may be a down-conversion (i.e., to a lower frequency).

For purposes of illustration, the first type of communication signal may be a mobile telephone signal (e.g. 65 m, 900 or 65 m 1800) and the second type of communication signal may be a millimeter wave signal.

The second communication module may be mounted on the side of a building. As referenced, the second communication module of an illustrative embodiment may receive the millimeter wave signal from the first communication module and transmit the millimeter wave radio signal inside the building to a third communication module. The third communication module may receive the millimeter wave radio signal and convert the millimeter wave radio signal back into the communication signal (e.g. the mobile telephone signal). The third communication module may then transmit the communication signal. For example, a second fire fighter fighting a fire inside a building can receive communication from the first fire fighter outside. In a similar but reverse manner, the second fire fighter can communicate with the first fire fighter. Without the first, second, and third communication modules, the first and second fire fighters may be unable to communicate.

In many buildings, particularly tall buildings, there is some difficulty in mobile telephone radio signals penetrating the building, thus, making it difficult for mobile telephone users inside the building to conduct mobile telephone conversations. Accordingly, in example embodiments, the first communication module, the second communication module, and the third communication module can be utilized so that there can be mobile telephone (or other desired communication type) coverage inside such a building. As will be readily appreciated by one of ordinary skill in the art, having had the benefit of the present disclosure, the first type of communication signal is chosen to be a different type of communication signal than that normally used in a mobile telephone system. In example embodiments, the millimeter wave radio signal is used to avoid interference with other mobile telephone systems.

In example embodiments, the first communication module and/or the second communication module include communication processing circuitry. The communication processing circuitry is able to validate communication signals and only transmit the communication signal as a converted millimeter wave radio signal if the communication signal is validated. According to example embodiments, this validation is beneficial as important communication signals can be transmitted, while the blocked unimportant communication signals will not interfere with the important communication signals. For example, if a large building was on fire, it would be expected that many people with mobile phones will try to telephone their relatives at the same time. When this happens, the mobile telephone system may become overloaded, which may prevent rescuers (e.g. fire fighters) from communicating with their colleagues. Accordingly, by validating communication signals, only the fire fighter mobile telephone signals would be transmitted as a millimeter wave radio signal within the building on fire. Accordingly, the fire fighters will not have trouble communicating rescuer colleagues, thus potentially saving lives.

Figure 1:
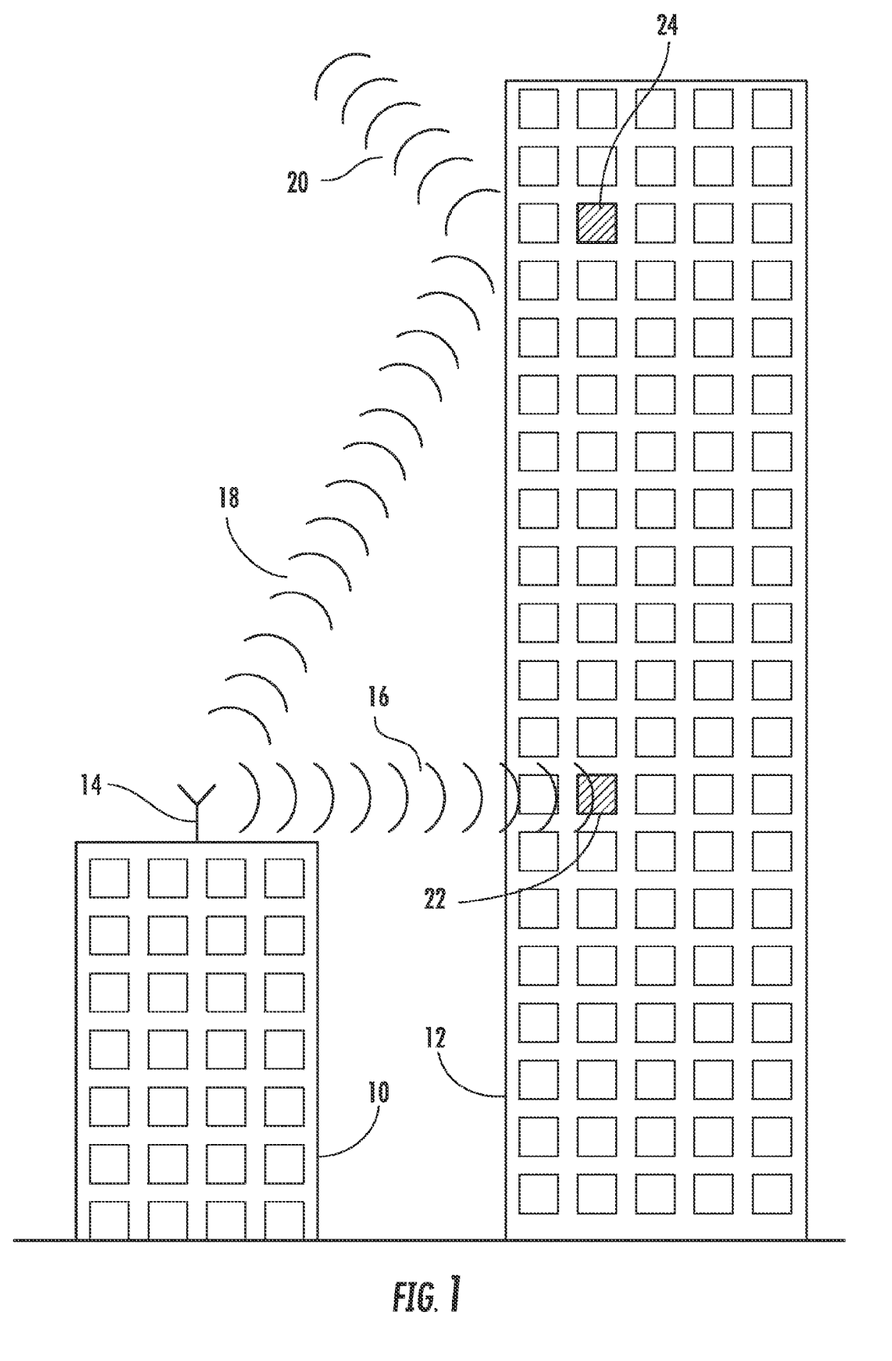
FIG. 1 is an illustration of a communication signal deflecting off of a tall building in accordance with an example embodiment.

FIG. 1 is an illustration of a radio signal 20 deflecting off of a building 12 in accordance with an example embodiment. The building 12 is illustratively a relatively tall building with many different levels. Inside the building 12 there may be a plurality of mobile telephone users. For example, a mobile telephone user may be at a first location 22 and another mobile telephone user may be at a second location 24. The mobile telephones generally communicate with base stations which serve a geographic region. Often, the base stations of the mobile network (which include at least one antenna) are placed on top of the buildings. In FIG. 1, an antenna 14 of a base station is mounted on the top of the building 10. The antenna 14 transmits to and receives mobile signals from a plurality of mobile telephone users. For example, a mobile telephone user at the first location 22 receives a communication signal 16 from the antenna 14. Since the mobile signal 16 is oriented directly at the building 12, the signal 16 can easily penetrate the building to reach the first location 22 and serve the mobile telephone users at the first location 22. One of ordinary skill in the art would appreciate that another radio signal transmitted from the mobile users at the first location 22 will travel a similar path as the radio signal 16 (in the opposite direction) to reach the antenna 14.

The antenna 14 may also be used to attempt, to communicate with mobile users at the second location 24 of the building 12. Because the second location 24 is at a higher elevation than the first location 22, a mobile signal 18 will have to penetrate the building at an angle. However, due to well known principles of electromagnetic wave interaction at media interfaces, depending on the angle of incidence to the building 12, the penetration of the signal 18 may be too low for proper reception. Instead the mobile signal 18 is mostly reflected from building 12 as the mobile signal 20. When the radio signal 18 is substantially reflected and is not refracted (i.e., does not penetrate) into the building, the mobile telephone users at location 24 cannot be served by antenna 14. One of ordinary skill in the art will appreciate the same principle is similarly applied when the user at location 24 sends a signal to antenna 14.

Figure 2:
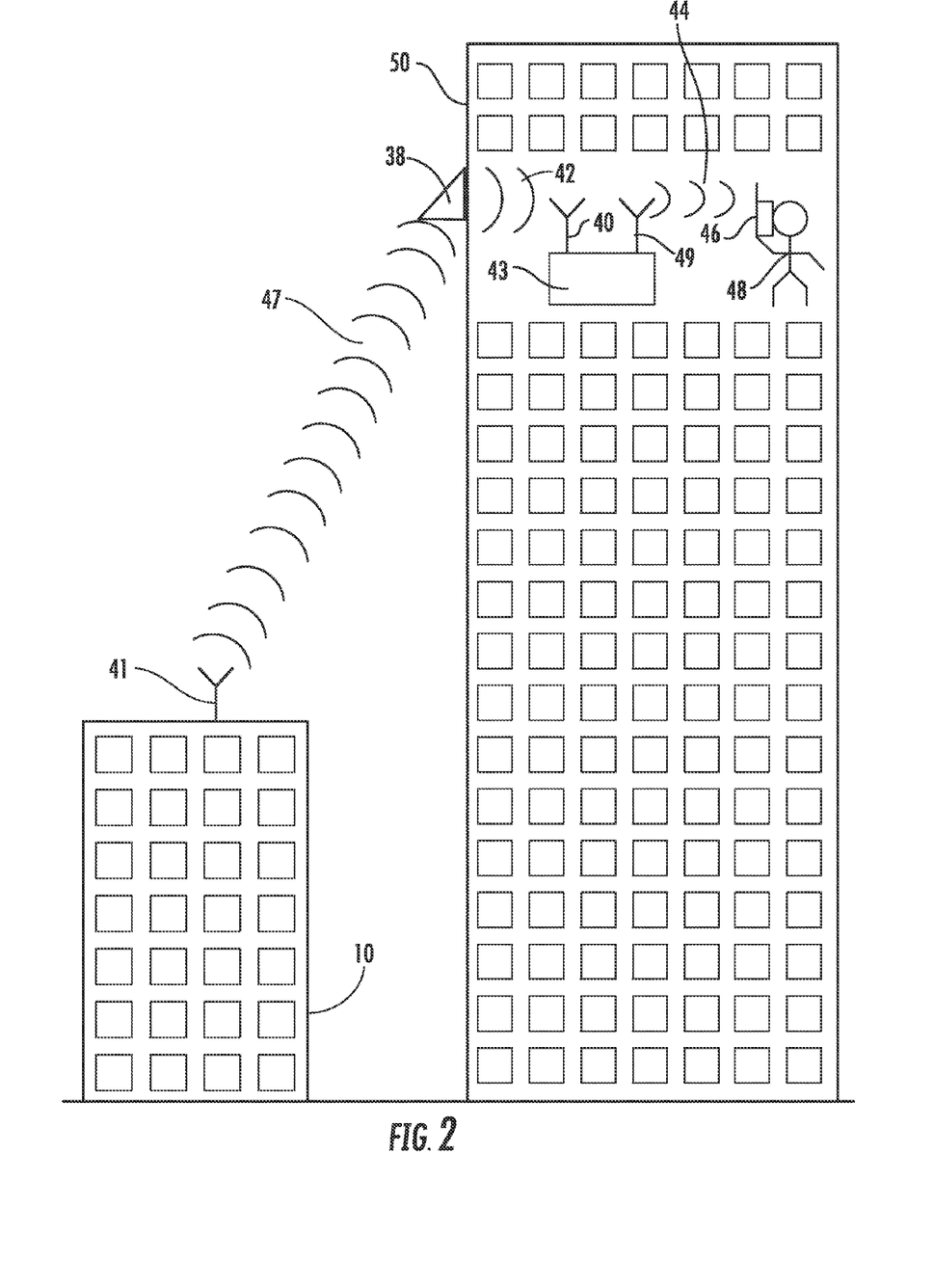
FIG. 2 is an illustration of a building mounted antenna which transmits a radio signal into the building in accordance with an example embodiment.

FIG. 2 is an illustration of an antenna 38 mounted on the side of a building 50 in accordance with an example embodiment. The antenna 38 directs a communication signal 47 from an antenna 41 into the building 50 as a communication signal 42. The antenna 38 may be mounted on the side of the building at a higher elevation than the antenna 41. Without the antenna 38, the signal 47 may be deflected off of the building 50 so the mobile telephone user 48 will not be serviced. In exemplary embodiments, the communication signal 47, 42 are mobile telephone radio signals, operating at, for example 200 MHz, 800 MHz, 1800 GHz or 2 GHz, and bands thereabout. The signal 42 may be directly received at the mobile telephone 46.

In other example embodiments, the communication signal 47 is a millimeter wave radio signal that is directed inside the building 50 by the antenna 38 as the communication signal 42. The signal 42 is then received at a communication module 43. Specifically, the signal 42 is received at an antenna 40. The communication module 43 then converts the signal 42 from a millimeter wave radio signal into a mobile telephone signal (the communication signal 44). In this embodiment, the signal 44 is amplified in the communication module 43. The radio signal 44 may then be transmitted by an antenna 49 to a communication terminal 46. In this embodiment, the transceiver 46 is a mobile telephone.

In certain example embodiments, the antenna 38 is a low to moderate gain array antenna. The low to moderate gain array antenna may include interconnected beam forming array patterns on both outward and inward facing sides separated by an intervening ground plane. However, one of ordinary skill in the art will recognize that different types of antennas that could direct a communication (e.g. mm wave) signal inside a building by being mounted either outside or inside of the building. Further, one of ordinary skill in the art will recognize that different configurations for the communication module 43 may be effected to accomplish the purpose of down converting or up converting a communication signal. One of ordinary skill in art would appreciate that a similar communication protocol would be used for a user 48 to send a signal to the antenna 41 in a reverse direction using the mobile telephone 46.

Figure 3:
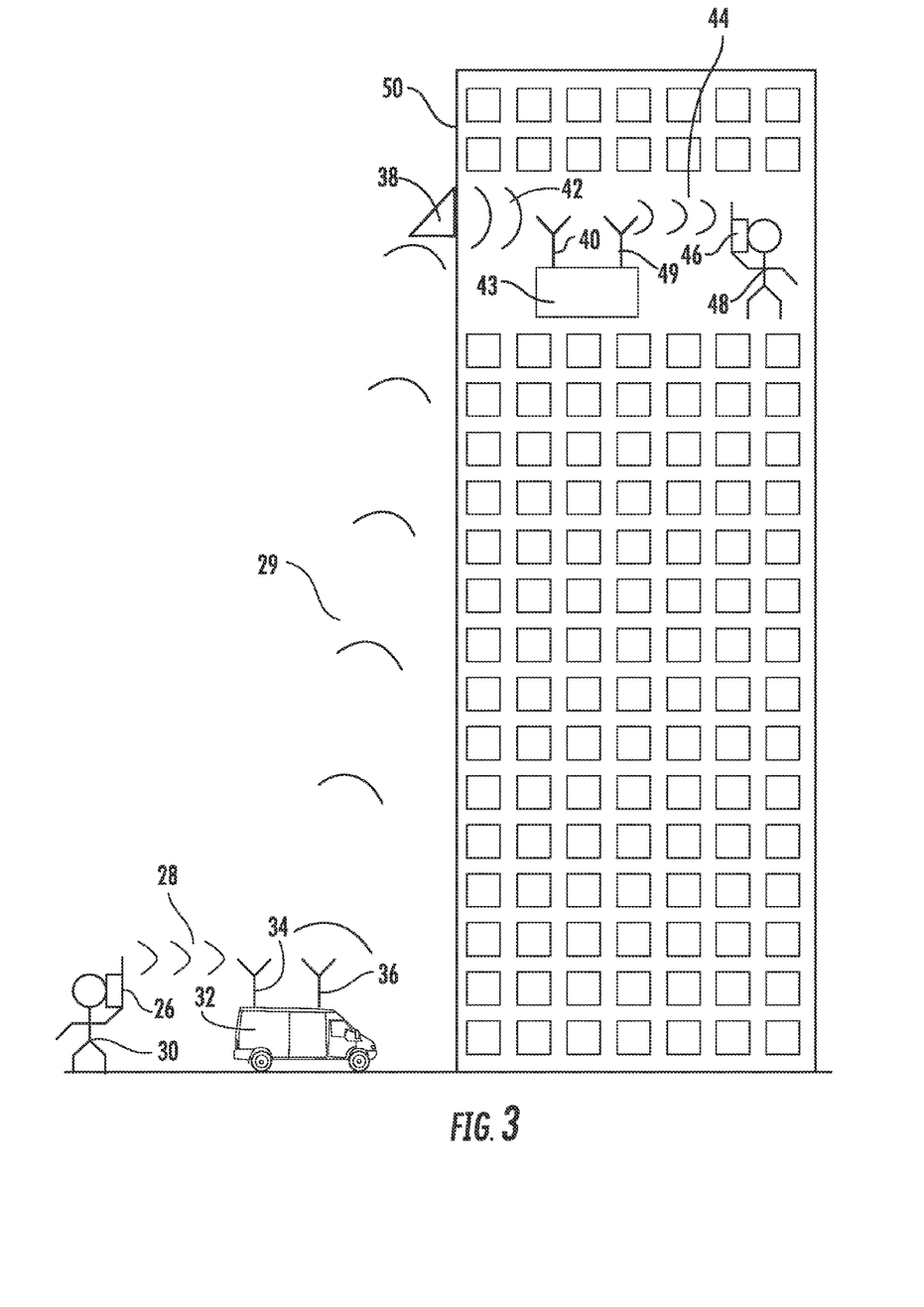
FIG. 3 is an illustration of a building mounted antenna which directs a radio signal from a mobile transmitter into the building in accordance with an example embodiment.

FIG. 3 is an illustration of a communication system utilizing a vehicle 32 in accordance with an example embodiment. In certain example embodiments, the antenna 38 communicates with the vehicle 32. The vehicle 32 may be an emergency vehicle used by police, fire fighters, or paramedics to insure that communication with their colleagues inside a tall building can be achieved. However, one of ordinary skill in the art will recognize that other applications exist for the vehicle 32, aside from use by emergency personnel.

In the example embodiment of FIG. 3, a user 30, located on the ground, communicates a signal 28 (a mobile radio signal) from a transceiver (e.g. a radio) 26 to an antenna 34 attached to the top of the vehicle 32. The signal 28 received at the antenna 34 is processed inside the vehicle 32, converted to a millimeter wave radio signal (a communication signal 29) and transmitted from an antenna 36. The signal 29 is then received at the antenna 38, in a similar manner as described above with reference to FIG. 2. The millimeter wave radio signal may be converted back to the mobile telephone signal (as communication signal 44) at the communication module 43. One of ordinary skill in the art would appreciate that a similar process may be utilized by user 48 to send a signal to user 30.

Figure 4:
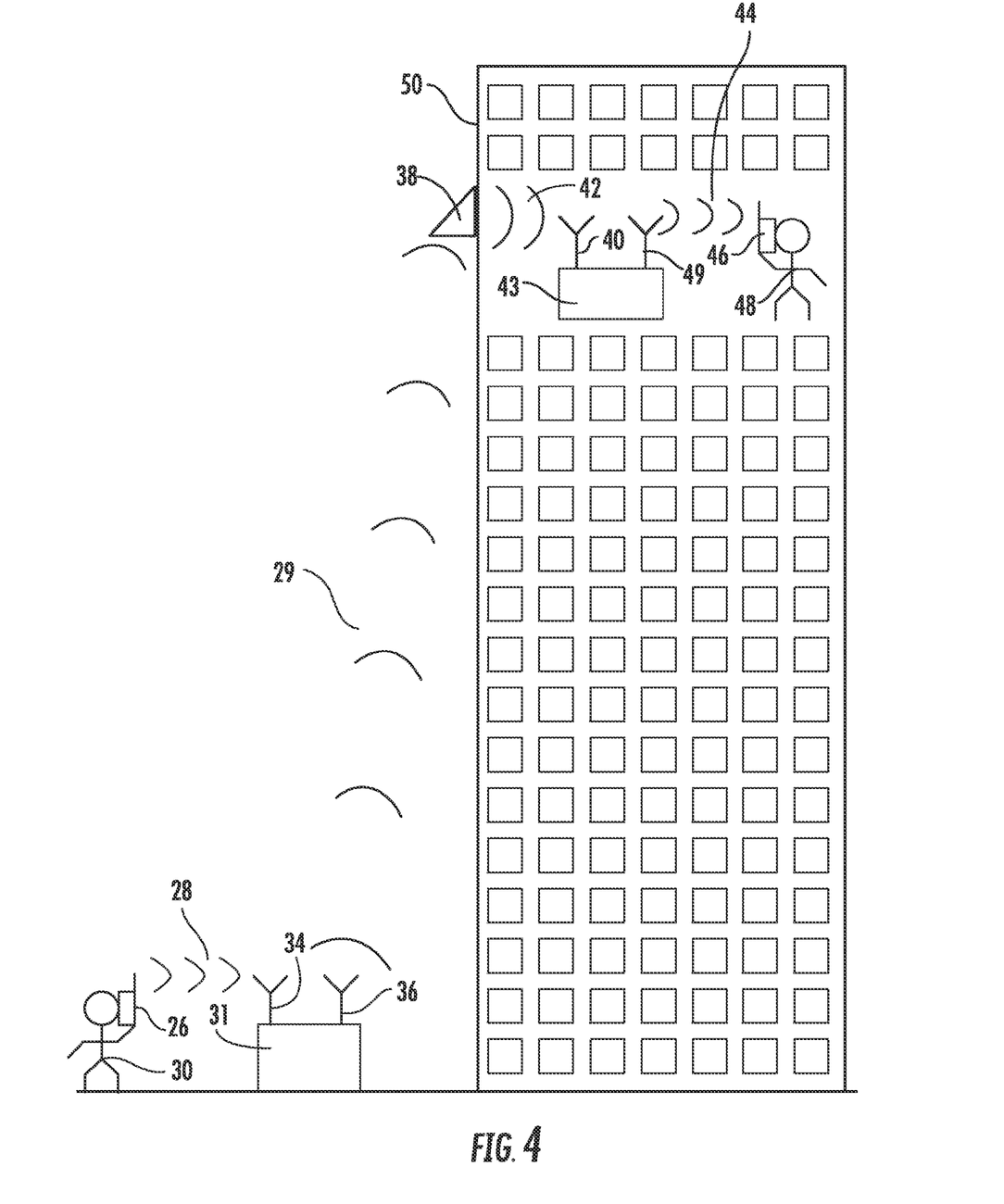
FIG. 4 is an illustration of a building mounted antenna which directs a radio signal from a stationary radio terminal on the ground to the inside of a building in accordance with an example embodiment.

FIG. 4 is an illustration of an example embodiment that is similar to FIG. 3. However, instead of the emergency vehicle 32, a communication module 31 is utilized. The communication module 31 may be a stationary structure. In this embodiment, the communication module 31 is located at a lower elevation than the communication module 43 and the user 48. In all other respects, this embodiment is substantially the same as the illustrative embodiment described with reference to FIG. 3.

Figure 5:
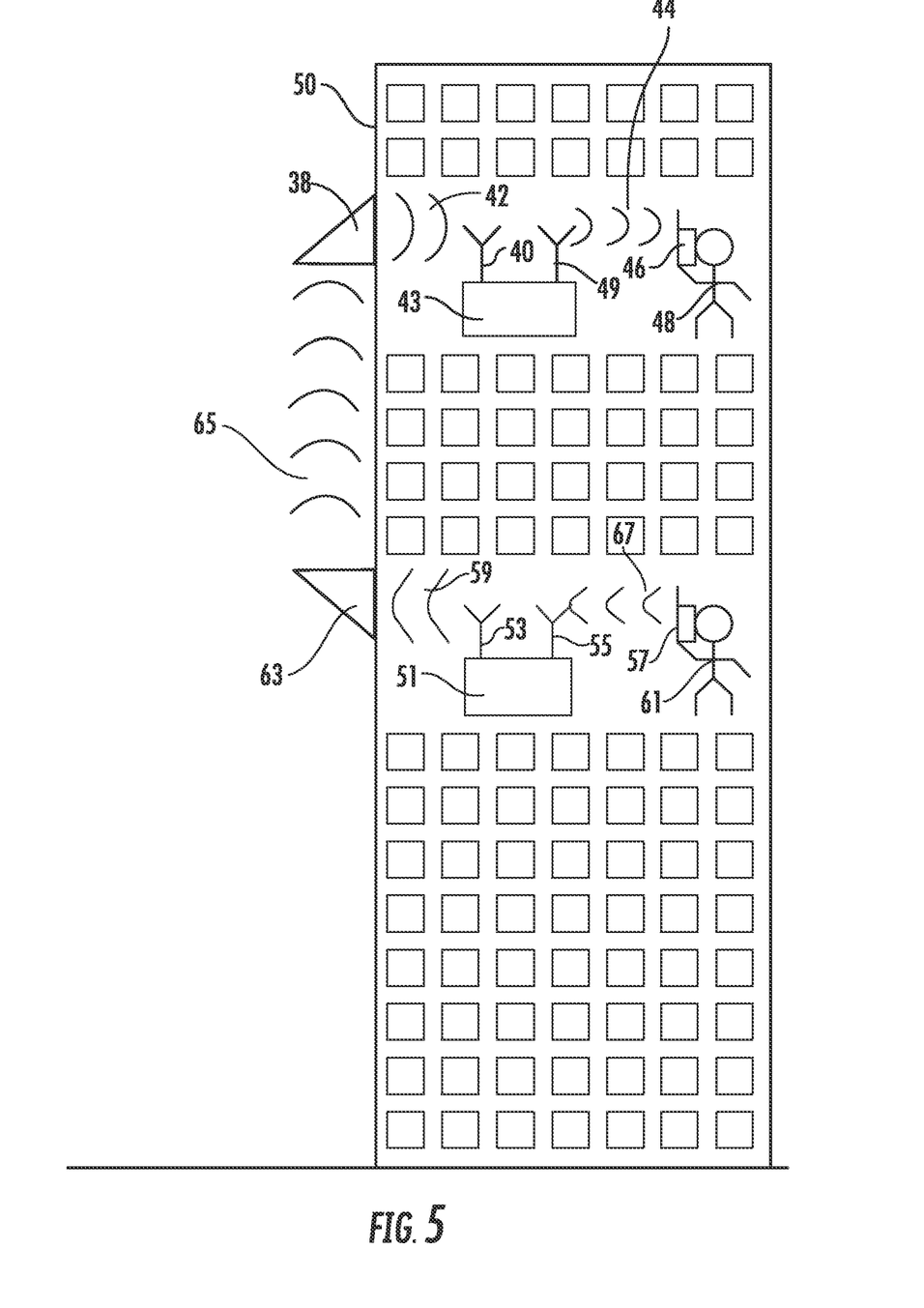
FIG. 5 is an illustration of floor-to-floor communication using a plurality of antennas mounted to the side of a building in accordance with an example embodiment.

FIG. 5 is an illustration of floor-to-floor communication using external antennas 38 and 63 in accordance with an example embodiment. The user 48 may also communicate with a second user 61 on another floor of the same building utilizing the building mounted antennas 38 and 63. The antenna 63 is mounted on the side of the building 50 on a different level than the antenna 38. The antenna 63 may also be configured to communicate with the communication module 31, the vehicle 32, or the antenna 41 of FIGS. 2, 3, and 4. However, the antenna 63 and the antenna 38 can also be used so that the first user 48 and the second user 61 can communicate between floors. In the example of FIG. 5, the second user 61 communicates using a transceiver 57 (e.g. a mobile telephone). The transceiver 57 sends a radio signal 67 (e.g. a mobile telephone signal) to an antenna 55. The signal 67 is processed by the communication module 51 and transmitted as a signal 59 to the antenna 63 from an antenna 53. In this embodiment, the communication module 51 converts a first type of communication signal (e.g., communication signal 67) into a second type of communication signal (e.g., communication signal 59), which is received at the antenna 63. The antenna 63 then transmits the radio signal 65 to the antenna 38. The radio signal 65 is directed inside the building 50 similar to that illustrated in FIGS. 2, 3, and 4. In an illustrative embodiment, the conversion is an up-conversion; the first type of signal may be mobile telephone signal and the second type of signal may be a mm-wave signal. Of course, this is not essential, and a down-conversion may be effected instead.

Figure 6:
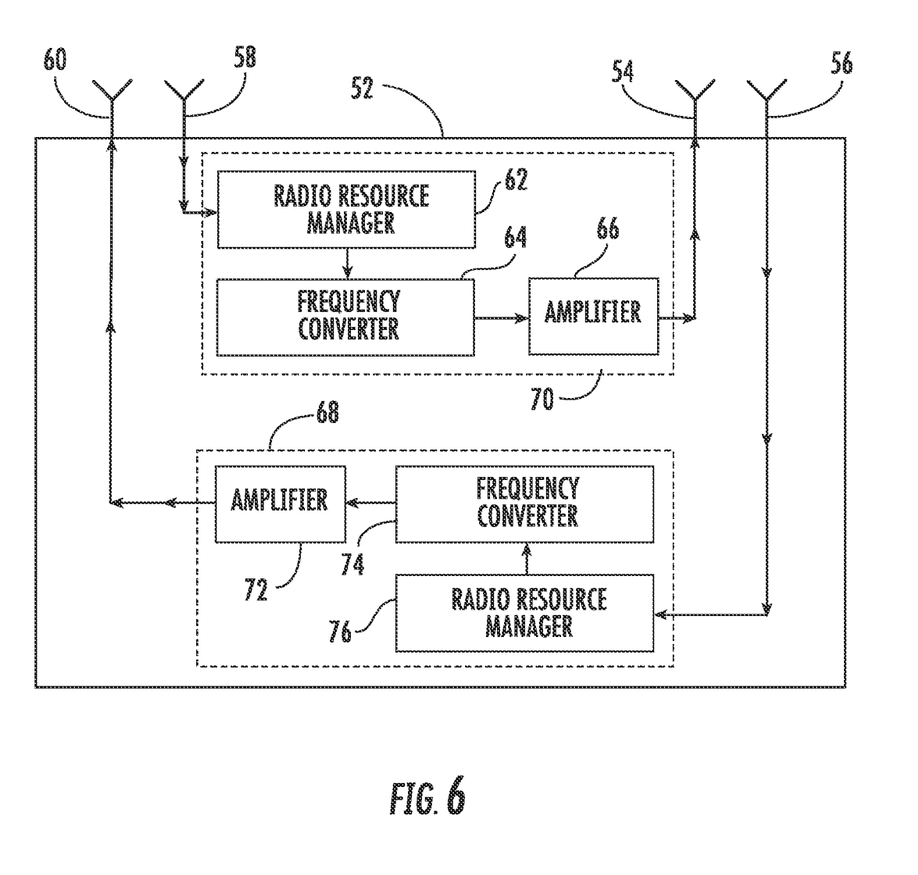
FIG. 6 is an illustration of a transmitter/receiver including a radio resource manager, a frequency converter, and an amplifier in accordance with an example embodiment.

FIG. 6 is an illustration of a communication module that may be utilized in example embodiments. For example, the communication module 52 illustrated in FIG. 6 may be utilized as the communication module 43, the communication module 51, the communication module 31, or in the vehicle 32 of FIGS. 2, 3, 4, and 5. In this embodiment, the communication module 52 includes a first antenna 60, a second antenna 58, a third antenna 54, and a fourth antenna 56. The first antenna 60 and the second antenna 58 are configured to receive and transmit relatively low frequency signals (illustratively, mobile telephone signals). Likewise, the third antenna 54 and the fourth antenna 56 are configured to transmit and receive relative high frequency signals (illustratively, millimeter wave communication signals). For example, the communication module 43 receives a millimeter wave communication signal at antenna 40. Similarly, the communication module 52 will receive a similar millimeter wave communication signal at the antenna 56. The signal may be transmitted to a signal processing section 68.

In the signal processing section 68, the received signal may be received by a resource manager 76. The radio resource manager 76 may validate the signal and determine whether it is to be transmitted by the antenna 60 as a mobile telephone signal. In alternate embodiments, the resource manager is not utilized, as signals do not need to be validated.

If the radio resource manager 76 determines that the signal is to be transmitted, it may be transmitted to a frequency converter 74. In the frequency converter 74, the millimeter wave radio signal is converted into a mobile telephone radio signal. The mobile telephone radio signal may then be amplified by an amplifier 72. The amplified mobile telephone radio signal is then transmitted by the antenna 60. The antenna 60 corresponds to the antenna 49 in FIGS. 2, 3, 4, and 5. One of ordinary skill in the art will recognize that the antennas 54 and 56 could be the same antennas used for both transmission and reception. However, the two antennas 54 and 56 are illustrated to simplify the exemplary figure. Likewise, the same simplification is apparent for antennas 58 and 60.

The antenna 55 in FIG. 5 corresponds to antenna 58 of FIG. 6. Likewise, signal 67 of FIG. 5 may be received at antenna 58 of FIG. 6. The signal 67 may be transmitted to a radio resource manager 62 inside the signal processing section 70. The resource manager 62 may validate the signal 67 to determine if it is to be transmitted. If the signal 67 is validated, it may be converted to a millimeter wave signal by an frequency converter 64 and may be amplified by an amplifier 66. The amplified millimeter wave radio signal may then be transmitted by the antenna 54. One of ordinary skill in the art could modify or omit any one of the components or communication module 52. It is noted that up-conversion of other signals may be effected in keeping with the illustrative embodiments. Moreover, if down-conversation were desired, similar elements the converter 74 could be configured to effect this desired end. Details of these variations will be readily apparent to one of ordinary skill in the art, and, as such are omitted so as to not obscure the description of the present embodiment.

Example embodiments relate to a mobile interface facility that is adapted to receive or intercept conventional mobile and legacy wireless communication signals intended for upper floor communications with emergency service providers. A predetermined code (based upon floor level and services priorities) may be used to organize the flow of traffic to and from the upper floor levels of tall buildings. These signals originate from users at both ends of a communication link at frequencies covering the conventional wireless communication bands, (e.g., 400 MHz, 800 MHz, 900 MHz, 1800 MHz and 2 GHz). The intercepted signals, once prioritized, are conveyed to a block up converter that converts the signals to a millimeter wave (MMW) frequency band (e.g. 24 GHz). It then conveys them to a vehicle's very high gain roof-mounted fan-beam antenna that is used to illuminate one or more sides of the building requiring emergency service.

In this embodiment, the MMW transmissions up the side of the building are intercepted by low to moderate gain array-antennas that are mounted on appropriate windows servicing each of the upper floors. These MMW antennas are special in that they have interconnected beam-forming array patterns on both the outward and inward facing sides, each separated from the other by an intervening ground plane. The outward facing array can transmit and receive signals to/from the mobile interface facility or upward for floor-to-floor communications. The inward facing antenna is a high gain array that transmits or receives signals to and from another (second) high-gain MMW array antenna that is located approximately 50 feet from the window-mounted antenna inside the building. This second MMW antenna conveys its received signals to a low-noise MMW receiver that delivers them to a converter where they are down converted to their originating frequency bands. The signals are then amplified and delivered to a low-frequency antenna where they are retransmitted at a power level sufficient to provide maximum wireless floor coverage at an acceptable signal-to-interference and noise level. In various embodiments, a number of MMW links for each floor provide appropriate or redundant RF coverage from all sides of a building. Of course the reverse path communications are facilitated by the same up and down conversion processes-signals originating at an upper floor level are up-converted to the MMW band and transmitted to the window-mounted antenna for transmission upward for floor-to-floor communications or downward to the mobile interface facility.

In this embodiment, the conversion to a MMW frequency band facilitates the implementation of two features that can obviate the problems associated with current conventional wireless communications systems that are used to service tall buildings. First, only the prioritized signals are converted for MMW transmission. This may give the mobile interface facility an opportunity to manage RF channel allocations dynamically while prioritizing communications floor-to-floor to minimize interference and maximize RF channel utilization. Second, the floor level down-converted signals can be established at a power level consistent with the required signal-to-interference and noise levels necessary for reliable communications. It is as if a cell-site were positioned at each of the upper level floors of a tall building.

From a technology point of view, conversion to a MMW band may allow the deployment of space-conservative, very high-gain antennas that can be mounted on the roof of a vehicle, namely the mobile interface facility, or on the outside face of a tall building window. The MMW propagation link is also minimally intrusive to conventional wireless communication channels. The transmissions can be readily confined so that interference into or out of the link propagation path can be minimized.

The following is an example of a MMW link at 24 GHz implemented between the mobile interface facility and an upper floor window of a tall building. The upward link from the mobile facility may be implemented using a SiGe block up converter that takes the lower frequency transmissions at 200 MHz, 800 MHz and 2 GHz, converts them to a 24 GHz band and develops a transmit power level of 15 dBm. The opportunity to establish priorities for communications to specific floors and the occupants of the floor is an important distinguishing feature facilitated by the MMW conversion process. This power level is submitted to a high gain antenna having a gain (Gts) of 1000, that sends the signals upward along the side of a tall building to a window assumed to be 1000 feet above street level. The signal is intercepted by a window-mounted MMW antenna that has a downward gain (Grw) of 2. The signal is then conveyed by the downward-looking antenna to an inward looking antenna on the window side of the antenna structure having a gain (Gtw) of 1000. The signal is retransmitted at 24 GHz to the antenna of a block down converter that has a gain (Grc) of 1000. The signal is then conveyed to the block down converter receiver that has an assumed noise figure of 5 dB. The block downconverter, assumed to be located 50 feet from the window-mounted antenna, converts the signal spectrum at 24 GHz back down to the original conventional wireless signal frequency band. The signals are then amplified and delivered to a floor level antenna or antenna system. The signals are then radiated by this antenna system to provide signal coverage to all areas of the particular floor at a signal level at least 24 dB above any anticipated noise or signal interference. The opportunity to establish this desired margin or signal-to-interference and noise is another exemplary distinguishing feature facilitated by the use of a MMW link.

In an exemplary alternate embodiment, a window mounted antenna transceiver system is used to provide the required floor coverage. It may be necessary to provide the necessary coverage using more than one window antenna and downconversion system for each floor. It may be necessary to use window mounted transceiver systems for several or all sides of the building. Of course this may require the use of more than one ground vehicle to cover different sides of the building.

An exemplary effective noise temperature, Tec, the converter whose channel bandwidth ($B_c$) is 30 KHz is:

$$T_{ec} = T_o \cdot (f-1), \text{ wherein}$$

$$T_o = 300 \; B_c = 30 \cdot 10^3 \; k = 1.38 \cdot 10^{-23} \; f = 10^{.5}$$

$$T_{ec} = 648.683 \text{ degrees Kelvin}$$

The noise floor (N), of the block converter may be given by $$N_f = k \cdot (T_{ec} + T_o) \cdot B_c$$

The minimum allowable signal to be conveyed to the converter (Srmin) may be 30 times or 15 db higher than the noise floor for margin. For example:

$$S_{rmin} = 30 \cdot N_f 1000 \text{ milliwatts}$$

$$S_{rmin} = 1.178 \times 10^{-11} \text{ milliwatts}$$

$$10 \cdot \log(S_{rmin}) = -109.288 \text{ dBm}$$

Since the maximum transmit power at the level is 15 dBm, the total allowable path loss between the street level power amplifier output and the block converter input is $$15 - (-109) = 124 \text{ dB}$$

The effective power density at the window mounted downward looking aperture ($P_{dwr}$), assuming signal strength falls off as the square of r, is given by $$P_{ts} = 31.6 \text{ milliwatts per square foot, where}$$

$$P_{ts} = 31.6 \text{ milliwatts } G_{ts} = 1000 \; r_u = 1000 \text{ feet}$$

The effective area ($A_{ew}$) of the window-mounted downward looking aperture is $$\lambda = \frac{3 \cdot 10^{10}}{(2.54) \cdot 12 \cdot 24 \cdot 10^9} \text{ square feet, where}$$

$$\lambda = \frac{3 \cdot 10^{10}}{(2.54) \cdot 12 \cdot 24 \cdot 10^9} \text{ feet} \quad G_{rw} = 2$$

The power intercepted by the downward looking beam ($P_{rw}$) is therefore $P_{rw} = P_{dwr} \cdot A_{ew}$ milliwatts $10 \cdot \log(P_{rw}) = -61.719$ dBm This power is delivered to the terminals of the inward facing antenna that has a gain ($G_{tw}$) of 1000. This antenna radiates the beam of energy to the receiving antenna of the block down converter through an exemplary lossy window having 10 dB loss. The converter is located at a distance of 50 feet from the inward facing aperture.

$L_w = 10 \quad G_{tw} = 1000$

The power density at the down converter's antenna ($P_{drc}$) is $$P_{drc} = \frac{P_{rw} \cdot G_{tw}}{4 \cdot \pi \cdot (50)^2 \cdot L_w}$$

We assume that the gain of the block down converter's receive antenna ($G_{rc}$) is 1000. The effective receive aperture of this antenna ($A_{ec}$) is $$G_{rc} = 1000 \quad A_{ec} = \frac{G_{rc} \cdot \lambda^2}{4 \cdot \pi}$$

Therefore the power level presented to the LNA of the block down converter ($P_{rc}$) is $P_{rc} = P_{drc} \cdot A_{ec}$ $10 \cdot \log(P_{rc}) = -95.425$ Assuming the noise figure of the block converter is 5 dB, the effective noise temperature at the input to the block converter receiver may be:

$T_{er} = 300(3-1)$ $T_{ei} = T_{er} + 300$ $N_{ir} = k \cdot T_{ei} \cdot B_c \cdot 1000$ $10 \cdot \log(N_{ir}) = -124.288$ dBm The total path loss ($L_{pt}$) is given by the ratio $P_{rc}/P_{ts}$ or $$L_{pt} = \frac{P_{rc}}{P_{ts}}$$

$L_{pt} = 9.075 \times 10^{-12}$ or $10 \cdot \log(L_{pt}) = -110.422$ dBm

Since the exemplary maximum allowable path loss is 124 dB for a signal-to-noise margin of 25 dB, the parameters of the assumed system will satisfy the criterion by 13.6 dB or $124 - 110.442 = 13.558$ dB The system can now use a frequency power amplifier and appropriate floor-level radiating antenna to create a significantly higher signal-to-interference and noise level than would be provided by mobile components.

In the above calculations, the MMW signal strength transmissions up and down the sides of the tall building may fall off by the square of the distance. Recognizing the possibility that MMW signal strengths fall off, an upper floor target downconverter can be placed 10 feet instead of 50 feet from the window, assuming that the window antenna has a 10 dB downward gain instead of 3 dB.

$$P_{dwr2} = \frac{P_{ts} \cdot G_{ts}}{4 \cdot \pi \cdot r_u^4}$$

The effective area (Aew2) of the window-mounted downward looking aperture is $$\lambda = \frac{3 \cdot 10^{10}}{(2.54) \cdot 12 \cdot 24 \cdot 10^9} \text{ square feet, wherein}$$

$$\lambda = \frac{3 \cdot 10^{10}}{(2.54) \cdot 12 \cdot 24 \cdot 10^9} \text{ feet and } G_{rw} = 10$$

The power intercepted by the downward looking beam ($P_{r2}$) is therefore $P_{rw2} = P_{dwr2} \cdot A_{ew}$ milliwatts $10 \cdot \log(P_{rw2}) = -114.729$ dBm This power is delivered to the terminals of the inward facing antenna that has a gain ($G_{tw}$) of 1000. This antenna radiates the beam of energy to the receiving antenna of the block down converter through an exemplary lossy window having 10 dB loss. The converter is located at a distance of 10 feet from the inward facing aperture.

$L_w = 10 \quad G_{tw} = 1000$

The power density at the down converter's antenna ($P_{drc2}$) is $$P_{drc2} = \frac{P_{rw2} \cdot G_{tw}}{4 \cdot \pi \cdot (10)^2 \cdot L_w}$$

We assume that the gain of the block down converter's receive antenna ($G_{rc}$) is 1000. The effective receive aperture of this antenna ($A_{ec}$) is $$G_{rc} = 1000 \quad A_{ec} = \frac{G_{rc} \cdot \lambda^2}{4 \cdot \pi}$$

Therefore the power level presented to the LNA of the block down converter ($P_{rc2}$) is $P_{rc} = P_{drc2} \cdot A_{ec}$ $10 \cdot \log(P_{rc2}) = -134.456$ Assuming the noise figure of the block converter is 3 dB rather than 5 dB the effective noise temperature at the input to the block converter receiver is:

$$T_{er} = 300(2-1)$$

$$T_{ei} = T_{er} + 300$$

$$N_{ir} = k \cdot T_{ei} \cdot B_c \cdot 1000$$

$$10 \cdot \log(N_{ir}) = -126.048 \text{ dBm}$$

Assuming a 10 dB margin instead of 15 dB, the maximum allowable path loss is now 15 dBm−(−116 dBm) or $$15-(-116)=131 \text{ dB}$$

The total path loss ($L_{pt2}$) is given by the ratio $P_{rc2}/P_{ts}$ or $$L_{pt} = \frac{P_{rc2}}{P_{ts}}$$

$$L_{pt} = 1.134 \times 10^{-15} \quad \text{or}$$

$$10 \cdot \log(L_{pt}) = -149.453 \text{ dB}m$$

Recalling that the exemplary maximum allowable path loss is 131 dB for a signal-to-noise margin of 10 dB the parameters of the assumed system will miss the criterion by 18 dB or $$149.5-131.442=18.058 \text{ dB}$$

The transmit power may be increased 63× from 31.6 milliwatts to 2 watts. This will require a 20 dB gain MMW power amplifier at the mobile interface facility and the floor level converter. Notice also we have assumed a 3 dB noise figure for the MMW receivers. Consequently the front ends and the output ends of the MMW transceivers will likely require PHEMT GaAs devices to augment the performance of the SiGe devices. The fall-off rule whether to the power of 2 or 4 is critical to the final system rationalization. The system can now use a frequency power amplifier and appropriate floor-level radiating antenna to create a significantly higher signal-to-interference and noise level than would be provided by mobile components.

In view of this disclosure it is noted that the various methods and devices described herein can be implemented in either software or hardware or a combination of the two to achieve a desired level communication. Further, the various methods and parameters are included by way of example only and not in any limiting sense. Therefore, the embodiments described are illustrative and are useful in effecting communications between two or more devices using conversion to different communication wavelengths. In view of this disclosure, those skilled in the art can implement the various example devices and methods in determining their own techniques and needed equipment to effect these techniques, while remaining within the scope of the appended claims.

What is claimed is:

1. A communication system comprising: a first communication module configured to be mounted on a vertical outer surface of a given building; and a second communication module configured to be mounted on the vertical outer surface of the given building on a different vertical level from said first communications module; said second communication module also configured to receive radio signals from and transmit radio signals to said first communication module so that the radio signals propagate vertically along the vertical outer surface of the given building, encode the radio signals with a predetermined code based on the different vertical level of the second communication module and wherein encoding the radio signal further comprises encoding the radio signal with the predetermined code based upon at least one service priority, and transmit the radio signals horizontally into the given building.

2. The communication system of claim 1, wherein said second communications module comprises a horizontally facing antenna array directed horizontally into the given building.

3. The communication system of claim 1, wherein said second communications module comprises a vertically facing antenna array directed vertically toward said first communication module.

4. The communication system of claim 1, wherein the radio signal comprises an up-converted mobile communication signal.

5. The communication system of claim 1, wherein the radio signal comprises an up-converted legacy wireless communication signal.

6. The communication system of claim 1, wherein the radio signal comprises a down-converted legacy wireless communication signal.

7. The communication system of claim 1, wherein the radio signal comprises a millimeter wave radio signal.

8. A communication system comprising: a first communication module configured to be mounted on a vertical outer surface of a given building; and a second communication module configured to be mounted on the vertical outer surface of the given building on a different vertical level from said first communications module; said second communication module comprising a vertically facing antenna array configured to receive radio signals from and transmit radio signals to said first communication module so that the radio signals propagate vertically along the vertical outer surface of the given building, encode the radio signals with a predetermined code based on the different vertical level of the second communication module and wherein encoding the radio signal further comprises encoding the radio signal with the predetermined code based upon at least one service priority, and a horizontally facing antenna array configured to transmit the radio signals horizontally into the given building.

9. The communication system of claim 8, wherein the radio signal comprises an up-converted mobile communication signal.

10. The communication system of claim 8, wherein the radio signal comprises an up-converted legacy wireless communication signal.

11. The communication system of claim 8, wherein the radio signal comprises a down-converted legacy wireless communication signal.

12. The communication system of claim 8, wherein the radio signal comprises a millimeter wave radio signal.

13. A communications method comprising: receiving at a first communication module a radio signal transmitted from a second communication module, wherein the first and second communication modules are mounted to a vertical outer surface of a given building at different levels; encoding the radio signal at the second communication module with a predetermined code based on the level of the second communication module, and wherein encoding the radio signal further comprises encoding the radio signal with the predetermined code based upon at least one service priority; and transmitting the radio signal from the first communication module horizontally into the given building based on the predetermined code.

14. The method of claim 13, wherein the radio signal comprises an up-converted mobile communication signal.

15. The method of claim 13, wherein the radio signal comprises an up-converted legacy wireless communication signal.

16. The method of claim 13, wherein the radio signal comprises a down-converted legacy wireless communication signal.

17. The method of claim 13, wherein the radio signal comprises a millimeter wave radio signal.

18. The method of claim 13, wherein the radio signal includes an indication of the level of the second communication module.

* * * * *